United States Patent [19]

Van Der Horst

[11] Patent Number: 5,721,491
[45] Date of Patent: Feb. 24, 1998

[54] DETERMINING ELECTRICAL CONDUCTIVITY OF AN EARTH LAYER

[75] Inventor: Melis Van Der Horst, GD Rijswijk, Netherlands

[73] Assignee: Shell Oil Company, Houston, Tex.

[21] Appl. No.: 566,249

[22] Filed: Dec. 1, 1995

[30] Foreign Application Priority Data

Dec. 5, 1994 [EP] European Pat. Off. ............ 94203529

[51] Int. Cl.$^6$ ..................................................... G01V 3/10
[52] U.S. Cl. ..................................................... 324/339
[58] Field of Search ............................... 324/338, 339, 324/340, 341

[56] References Cited

U.S. PATENT DOCUMENTS 3,259,837  7/1966  Oshry ........................ 324/339
3,893,021  7/1975  Meador et al. ............... 324/341

OTHER PUBLICATIONS

Tabarovskii et al., 1979, "Radial Characteristics of Induction Focusing Probes with Transverse Detectors in an Anisotropic Medium," *Soviet Geology and Geophysics*, 20, pp. 81–90.

*Primary Examiner*—Sandra L. O'Shea
*Assistant Examiner*—Jay M. Patidar
*Attorney, Agent, or Firm*—Del S. Christensen

[57] ABSTRACT

A method is provided for determining an electric conductivity of an earth formation formed of different earth layers, whereby a wellbore containing a wellbore fluid extends through said formation. The method includes lowering an induction logging tool into the wellbore to a location surrounded by a selected one of the earth layers, the tool including a magnetic field transmitter suitable to induce magnetic fields of different frequencies in said earth layers, and magnetic field receiver suitable to receive response magnetic fields at different spacings from the transmitter and to provide a signal representative of each response magnetic field. At least two of the different frequencies and at least two of the different spacings are selected, and for different combinations of each selected frequency and each selected spacing, the transmitter is operated so as to induce a magnetic field of the selected frequency in said earth layers, which magnetic field induces a corresponding response magnetic field near the tool. The receiver is operated at the selected spacing from the transmitter so as to provide a signal representing the response magnetic field. The signals are combined in a manner so as to create a combined signal having a reduced dependency on the electric conductivity in the wellbore region and the electric conductivity of an earth layer adjacent the selected layer.

8 Claims, 1 Drawing Sheet

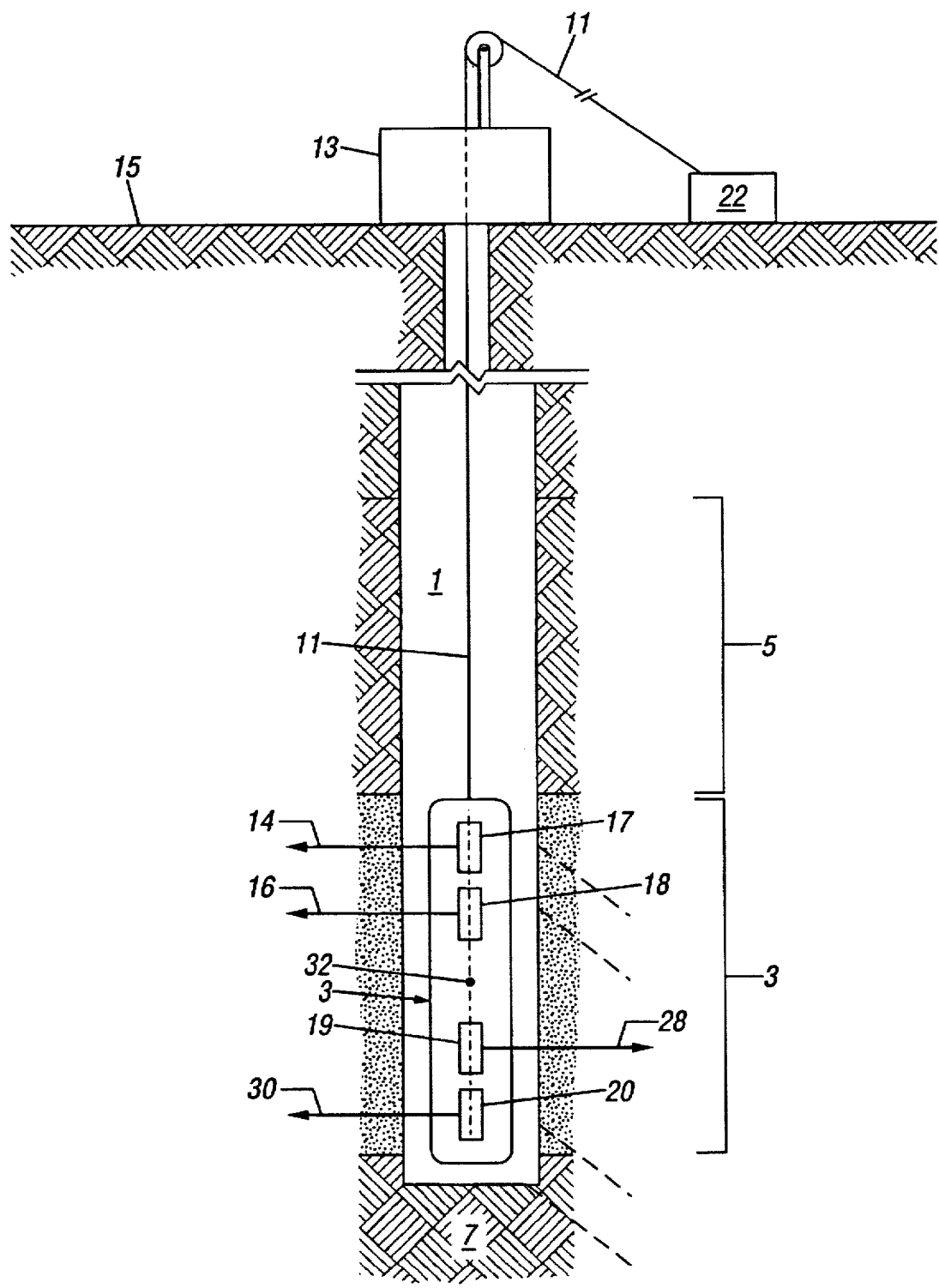

DETERMINING ELECTRICAL CONDUCTIVITY OF AN EARTH LAYER

FIELD OF THE INVENTION

The present invention relates to a method of determining electric conductivity of an earth formation formed of different earth layers, whereby a wellbore containing a wellbore fluid extends into the earth formation. Such method is also referred to as a logging method. More particularly, the invention relates to determining the electric conductivities of selected layers of the earth formation. The conductivities thus obtained can be used to determine the compositions of the individual layers, and to determine the presence of fluids such as oil, water or gas in such layers.

BACKGROUND TO THE INVENTION

In general, hydrocarbon-bearing zones are difficult to detect in laminated clastic reservoirs consisting of alternating thin layers of shale and sand, when using a conventional induction logging tool. If the layers are too thin to be detected individually by the induction logging tool because the vertical resolution of the tool is too low, the tool reads an average conductivity of the formation. In a vertical borehole, a conventional induction logging tool with the magnetic dipole moments in vertical direction reads an average conductivity which is a combination of the sand- and shale conductivities, but which is dominated by the relatively high conductivity of shale layers. A transversal induction logging tool with the magnetic dipole moments in horizontal direction reads an average conductivity which is dominated by the relatively low conductivity of the hydrocarbon-bearing sand layers.

If the volume of shale/sand in the formation is known, e.g. from measurements using a gamma-ray tool or a nuclear tool, a combination of a conventional induction logging tool and transversal induction logging tool can be used to determine the conductivities of the individual shale- and sand-layers, provided the layers of the same type have the same conductivity. However, the response of the transversal induction logging tool is difficult to interpret because its response suffers from large borehole-effects and wellbore fluid invasion-effects.

A known method of reducing the borehole-effects from the response of transversal induction logging tool is disclosed in Tabarovskii et al, 1979, "Radial characteristics of induction focusing probes with transverse detectors in an anisotropic medium", Soviet Geology and Geophysics, 20, pp. 81–90. In the known method an induction logging tool is used, which tool comprises magnetic field transmitter means suitable to induce a magnetic field in the formation, and magnetic field receiver means suitable to receive response magnetic fields at different spacings from the transmitter means and to provide a signal representative of each response magnetic field. However, the logs obtained when using this tool are rather "wild" and are therefore difficult to interpret. This problem becomes even more manifest when the tool is run through a sequence of earth layers.

It is therefore an object of the invention to provide a method of determining a characteristic of an earth layer of a laminated earth formation, in which a log response is obtained which is easy to interpret and which provides an accurate indication of the characteristic even if the thickness of the individual earth layers is relatively thin. It is a further object of the invention to provide a system for carrying out the method according to the invention. It is another object of the invention to provide an induction logging tool for use in the method and system according to the invention.

SUMMARY OF THE INVENTION

These and other objects are accomplished by a method for determining an electric conductivity of an earth formation formed of different earth layers, whereby a wellbore containing a wellbore fluid extends in the formation, the method comprising:

lowering an induction logging tool into the wellbore to a location surrounded by the selected one of the earth layers, the tool comprising magnetic field transmitter means suitable to induce magnetic fields of different frequencies in the formation, and magnetic field receiver means suitable to receive response magnetic fields at different spacings from the transmitter means and to provide a signal representative of each response magnetic field, the method comprising:

selecting at least two of the different frequencies and selecting at least two of the different spacings;

for different combinations of each selected frequency and each selected spacing, operating the transmitter means so as to induce a magnetic field of the selected frequency in the earth layers, which magnetic field induces a corresponding response magnetic field near the tool, and operating the receiver means at the selected spacing from the transmitter means so as to provide a signal representing the response magnetic field; and combining the signals in a manner so as to create a combined signal having a reduced dependency on the electric conductivity in a wellbore region and the electric conductivity of an earth layer adjacent the selected earth layer.

The signals can be written as a series expansion in the frequency, which series expansion contains a term being linear in the frequency and being mainly determined by the conductivity in the wellbore region. Furthermore, the series expansion contains a term which is non-linear in the frequency and which is mainly determined by the conductivity of the adjacent layer(s). By combining the equations describing the series expansions of the signals in such a manner that the terms linear in the frequency are eliminated from these equations, a new set of equations is obtained from which the influence of the wellbore region is virtually eliminated. Subsequently, the new equations thus obtained are combined in such a manner that from each equation the dominant term which is non-linear in the frequency is eliminated, so that a resulting equation is obtained from which the influence of the wellbore region and the influence of the adjacent layer are virtually eliminated. Furthermore, it was found that the signals at the receiver means only weakly depend on the spacing between the transmitter means and the receiver means, which spacing is hereinafter referred to as the tool-spacing. The series expansions of the signals are therefore also not significantly dependent on the tool-spacing.

The system according to the invention comprises:

means for lowering an transmitter logging tool into the wellbore to a location surrounded by the selected earth layer, the tool comprising magnetic field transmitter means suitable to induce magnetic fields of different frequencies in the formation, and magnetic field receiver means suitable to receive response magnetic fields at different spacings from the transmitter means and to provide a signal representative of each response magnetic field;

means for selecting at least two of the different frequencies and selecting at least two of the different spacings;

means, for different combinations of each selected frequency and each selected spacing, for operating the transmitter means so as to induce a magnetic field of the selected frequency in the earth layers, which magnetic field induces a corresponding response magnetic field near the tool, and means for operating the receiver means at the selected spacing from the transmitter means so as to provide a signal representing the response magnetic field; and means for combining the signals in a manner so as to create a combined signal having a reduced dependency on the electric conductivity in a wellbore region and the electric conductivity of the adjacent earth layer.

The induction logging for use in the method and system according to the invention comprises means for lowering the tool into the wellbore to a location surrounded by the selected earth layer, magnetic field transmitter means suitable to induce magnetic fields of different frequencies in the earth layers, magnetic field receiver means suitable to receive response magnetic fields at different spacings from the transmitter means and to provide a signal representative of each response magnetic field, means for selecting at least two of the different frequencies and selecting at least two of the different spacings, and means for combining the signals in a manner so as to create a combined signal having a reduced dependency on the electric conductivity in a wellbore region and the electric conductivity of the adjacent earth layer.

BRIEF DESCRIPTION OF THE FIGS.

FIG. 1 shows schematically a wellbore extending into a laminated earth formation, into which wellbore an induction logging tool as used in the method according to the invention has been lowered.

DETAILED DESCRIPTION OF THE INVENTION

The different combinations of selected frequency and selected spacing suitably comprise a combination of a first frequency and a first spacing, a combination of a second frequency and the first spacing, a combination of the first frequency and a second spacing, and a combination of the second frequency and the second spacing.

The combined signal can be arrived at in an efficient manner if each signal includes a linear component which is a linear function of the frequency of the response magnetic field and is substantially dependent on the conductivity in the wellbore region, and a dominant non-linear component which is a non-linear function of the frequency of the response magnetic field and is substantially dependent on the conductivity of the adjacent earth layer, and wherein the linear component is eliminated from the combined signal prior to eliminating the dominant non-linear component from the combined signal.

In an efficient embodiment of the method according to the invention, the tool comprises a first pair of induction coils and a second pair of induction coils, each pair of coils comprising a transmitter coil and a receiver coil, the transmitter coils defining the transmitter means and the receiver coils defining the receiver means.

Combining of the signals is carried out in an effective manner if the coils are so arranged that at least one of the transmitter coils and the receiver coils has a magnetic dipole moment opposite to the magnetic dipole moments of the other coils.

The effect of the different spacings between the transmitter coil and the receiver coil on the produced signals is further reduced if the pairs of coils have a common mid-point, the mid-point of each pair of coils being defined as a point located on a line interconnecting the coils of the pair and at equal distances from the coils of the pair.

To achieve optimal flow of current through the various earth layers, which current crosses the boundaries between the layers, suitably each coil is arranged so as to generate a magnetic dipole moment substantially parallel to the direction in which the earth layers extend. In case the wellbore extends substantially vertically and the earth layers extend substantially horizontally, suitably each coil is arranged so as to have a substantially horizontal magnetic dipole moment.

The frequencies of the magnetic fields to be induced in the formation are suitable selected to be between 40–200 kHz, preferably between 50–150 kHz.

Referring now to FIG. 1, a wellbore 1 extending into a laminated earth formation, into which wellbore an induction logging tool as used in the method according to the invention has been lowered is shown. The wellbore 1 extends into an earth formation which includes a hydrocarbon-bearing sand layer 3 located between an upper shale layer 5 and a lower shale layer 7, the shale layers 5, 7 having a higher conductivity than the hydrocarbon bearing sand layer 3. An induction logging tool 9 according to the invention has been lowered into the wellbore 1 via a wireline 11 extending through a blowout preventor 13 (shown schematically), the blowout preventor 13 being located on the earth surface 15 at the top of the wellbore 1. The logging tool 9 is provided with two transmitter coils 17, 18 and two receiver coils 19, 20, each coil 17, 18, 19, 20 being connected to surface equipment 22 via a set of conductors (not shown) extending along the wireline 11. The surface equipment 22 includes an electric power supply to provide electric power to the transmitter coils 17, 18 and a signal processor to receive and process electric signals from the receiver coils 19, 20.

The coils 17, 18, 19, 20 form transverse coils, i.e. they are oriented so as to have magnetic dipole moments 24, 26, 28, 30 perpendicular to the wellbore axis, whereby the direction of magnetic dipole moment 28 is opposite to the direction of magnetic dipole moments 24, 26, 30. Furthermore the coils 17, 18, 19, 20 are substantially aligned along the longitudinal axis of the logging tool 9, and are so arranged that the pair of coils 17, 20 and the pair of coils 18, 19 have a common mid-point 32 which is defined as the point located halfway the distance between the coils of such pair. The spacing between the coils of such pair is hereinafter referred to as the tool-spacing. The tool-spacing of the pair of coils 17, 20 is $L_1$, and the tool-spacing of the pair of coils 18, 19 is $L_2$, whereby $L_1 > L_2$.

During normal operation an alternating current of a frequency $f_1$ is supplied by the electric power supply of surface equipment 22 to transmitter coil 17 so that a magnetic field with magnetic dipole moment 24 is induced in the formation. This magnetic field extends into the sand layer 3 and thereby induces a current in the sand layer 3, which current is composed of a number of local eddy currents. The magnitude of such local eddy current is dependent on its location relative to the transmitter coil 17, the conductivity of the earth formation at the location, and the frequency at which the transmitter coil 17 operates. In principle the local eddy currents act as a source inducing new currents which again induce new currents. The current induced in sand layer 3 induces a response magnetic field, which is out of phase with the induced magnetic field, and which induces a response current in receiver coil 20. Because the magnitude of the current induced in the sand layer 3 depends on the conductivity of the sand layer 3, the magnitude of the response current in receiver coil 20 also depends on this conductivity and thereby provides an indication of the conductivity of the sand layer 3. However, the magnetic field generated by transmitter 17 not only extends into sand layer 3, but also in the wellbore fluid and in the shale layers 5, 7 so that currents in the wellbore fluid and the shale layers 5, 7 are induced, which lead to additional components in the response current in the receiver coil 20. These additional components can be linearly dependent on the frequency at which the transmitter coil 17 operates, or can be proportional to higher orders terms in the frequency. In general the higher order terms become dominant if the volume of the wellbore 1 is relatively large, and/or if the frequency or the conductivity is relatively large. If this is not the case, the dominant contribution of the wellbore fluid to the total response at the receiver coil 17 forms the component linear in the frequency.

The response magnetic field $h(f_1)$ which is received by the receiver coil 20 can be written as a series expansion in the frequency:

$$h(f_1) = f_1 h_1 + f_1^{3/2} h_2 + f_1^2 h_3 + \tag{1}$$

wherein $h_1$, $h_2$, $h_3$ are series expansion terms of the response magnetic field $h(f)$.

The component $f_1 h_1$ is substantially dependent on the conductivity in the wellbore region, i.e. this term depends on the conductivity of the wellbore fluid.

Next an alternating current of a frequency $f_2$ is supplied by the electric power supply of surface equipment 22 to transmitter coil 17 so that a magnetic field of frequency $f_2$ is induced in the formation. The frequency $f_2$ of the alternating current is selected suitably different from the frequency $f_1$ of the alternating current supplied to coil 17. Similar to the magnetic field of frequency $f_1$, the magnetic field of frequency $f_2$ induces a current in the layers 3, 5, 7, which current induces a response magnetic field in the formation, the response magnetic field inducing a response current in receiver coil 20. The response magnetic field received by receiver coil 20 can be written as a series expansion in the frequency:

$$h(f_2) = f_2 h_1 + f_2^{2/3} h_2 + f_2^2 h_2 + \tag{2}$$

The component $f_2 h_1$ in expression (2) is mainly dependent on the conductivity in the wellbore region.

By combining equations (1) and (2) in a suitable manner the components $f_1 h_1$ and $f_2 h_1$ can be eliminated, the resulting expression being:

$$h(f_1, f_2) = h(f_1) - (f_1/f_2) h(f_2) \tag{3}$$

In this way the terms linear in the frequency are eliminated, and thereby the influence of the wellbore region in the expression (3) is substantially eliminated. However, a disadvantage is that the influence of the adjacent layers, termed the shoulder-bed layers, has increased considerably and hence the vertical resolution has decreased. This is due to the fact that the terms proportional to $f^{3/2}$ have a very low vertical resolution.

The present invention uses the insight that the terms proportional to $f^{3/2}$ are virtually independent of the tool-spacing, and that the vertical resolution of the frequency focused response can be improved by combining the separate responses of two frequency focused transmitter/receiver pairs with different tool-spacings. In this way the terms proportional to $f^{3/2}$ can be cancelled. If the applied frequencies are selected to be equal for both transmitter/receiver pairs, this cancellation can suitably be achieved by using the same magnetic dipole moments for the transmitters 17, 18, but opposite magnetic dipole moments for the receivers 19, 20. Alternatively, different frequency pairs can be used for the transmitter/receiver pairs.

Accordingly, in a next step transmitter coil 18 is used to induce a magnetic field and corresponding current field in the formation, and receiver coil 19 is used to provide a signal indicative of the response magnetic field. The alternating current supplied to transmitter coil 18 is of frequency $f_1$, i.e. the same current frequency as previously supplied to transmitter coil 17. The response magnetic field h' can be written in a series expansion similar to expression (1), which series expansion contains a component $f_1 h'_1$ which is mainly dependent on the conductivity in the wellbore region, and a component $f_1^{3/2} h'_2$ which is mainly dependent on the conductivity of the shale layers 5, 7. Next an alternating current of frequency $f_2$ is supplied to transmitter coil 18 is, i.e. the same current frequency as previously supplied to transmitter coil 17. The response magnetic field h' can be written in a series expansion similar to expression (2), which series expansion contains a component $f_2 h'_1$ which is mainly dependent on the conductivity in the wellbore region, and a component $f_2^{3/2} h'_2$ which is mainly dependent on the conductivity of the shale layers 5, 7. By combining these series expansions in a manner similar as described with reference to expressions (1) and (2), the terms linear in the frequency can be eliminated, thereby arriving at a resulting expression:

$$h'(f_1, f_2) = h'(f_1) - (f_1/f_2) h'(f_2) \tag{4}$$

By combining expressions (3) and (4), the components with terms $f_1^{3/2}$ and $f_2^{3/2}$ can now be eliminated so that a resulting expression is obtained from which the influence of the conductivity in the wellbore region and the conductivity of the shale layers 5, 7 are virtually eliminated. This resulting expression is provided in the form of a combined signal by the surface equipment 22.

From the above it can be concluded that from a combination of different frequencies and different tool-spacings, a signal representing the conductivity of a selected earth layer can be provided, from which signal the influences of the wellbore region and adjacent earth layers are virtually eliminated.

I claim:

1. A method of determining an electric conductivity of an earth formation formed of different earth layers, whereby a wellbore containing a wellbore fluid extends through said earth formation, the method comprising:

lowering an induction logging tool into the wellbore to a location surrounded by said a selected one of the earth layers, the tool comprising magnetic field transmitter means suitable to induce magnetic fields of different frequencies in said earth formation, and magnetic field receiver means suitable to receive response magnetic fields at different spacings from the induction means and to provide a signal representative of each response magnetic field;

selecting at least two of said different frequencies and selecting at least two of said different spacings;

for different combinations of each selected frequency and each selected spacing, operating the transmitter means so as to induce a magnetic field of the selected frequency in the earth formation, which magnetic field induces a corresponding response magnetic field, and operating the receiver means at the selected spacing from the transmitter means so as to provide a signal, each signal representing the response magnetic field for different combinations of each selected frequency and each selected spacing; and combining a plurality of signals in a manner so as to create a combined signal having a reduced dependency on the electric conductivity in the wellbore region and the electric conductivity of an earth layer adjacent the selected earth layer;

wherein the tool comprises a first pair of coils and a second pair of coils, each pair of coils comprising a transmitter coil and a receiver coil, the first pair having a larger spacing between the transmitter coil and the receiver coil than the second pair, the transmitter coils defining the transmitter means and the receiver coils defining the receiver means and wherein the pairs of coils have a common mid-point, the mid-point of each pair of coils being defined as a point located on a line interconnecting the coils of the pair and at equal distances from the coils of the pair.

2. The method of claim 1 whereby each signal includes a component which is a linear function of the frequency of the response magnetic field and is substantially dependent on the conductivity in the wellbore region, and a component which is a non-linear function of the frequency of the response magnetic field and is substantially dependent on the conductivity of the adjacent earth layer, and wherein the linear component is eliminated from the combined signal prior to eliminating the non-linear component from the combined signal.

3. The method of claim 1, wherein the coils are so arranged that at least one of the transmitter coils and the receiver coils has a magnetic dipole moment opposite to the magnetic dipole moments of the other coils.

4. The method of claim 1, wherein each coil is arranged so as to generate a magnetic dipole moment substantially parallel to the direction in which the earth layers extend.

5. The method of claim 4, wherein the wellbore extends substantially vertically and the earth layers extend substantially horizontally, and wherein each coil is arranged so as to have a substantially horizontal magnetic dipole moment.

6. The method of claim 1 wherein the frequencies of the magnetic fields to be induced in the formation are suitable selected to be between 40–200 kHz.

7. A system for determining an electric conductivity of an earth layer located adjacent at least one other earth layer, whereby a wellbore containing a wellbore fluid extends through the earth formation, the system comprises:

means for lowering an induction logging tool into the wellbore to a location surrounded by a selected one of the earth layers, the tool comprising a first pair of coils and a second pair of coils, each pair of coils comprising a transmitter coil and a receiver coil, the first pair having a larger spacing between the transmitter coil and the receiver coil than the second pair, the transmitter coils defining the transmitter means and the receiver coils defining the receiver means and wherein the pairs of coils have a common mid-point, the mid-point of each pair of coils being defined as a point located on a line interconnecting the coils of the pair and at equal distances from the coils of the pair;

means for selecting at least two of the different frequencies and selecting at least two of the different spacings;

for different combinations of each selected frequency and each selected spacing, means for operating the transmitter means so as to induce a magnetic field of the selected frequency in the earth layers, which magnetic field induces a corresponding response magnetic field near the tool, and means for operating the receiver means at the selected spacing from the transmitter means so as to provide a signal representing the response magnetic field; and means for combining the signals in a manner so as to create a combined signal having a reduced dependency on the electric conductivity in a wellbore region and the electric conductivity of an earth layer adjacent the selected earth layer.

8. An induction logging tool for determining an electric conductivity of an earth formation formed of different earth layers, whereby a wellbore containing a wellbore fluid extends through the formation, the tool comprising:

means for lowering the tool into the wellbore to a location surrounded by a selected one of the earth layers;

a first pair of coils and a second pair of coils, each pair of coils comprising a transmitter coil and a receiver coil, the first pair having a larger spacing between the transmitter coil and the receiver coil than the second pair, wherein the pairs of coils have a common mid-point, the mid-point of each pair of coils being defined as a point located on a line interconnecting the coils of the pair and at equal distances from the coils of the pair and the transmitter coil suitable to induce magnetic fields of different frequencies in the earth formation, and receiver coil suitable to receive response magnetic fields and to provide a signal representative of each response magnetic field;

means for selecting at least two of the different frequencies; and means for combining the signals in a manner so as to create a combined signal having a reduced dependency on the electric conductivity in a wellbore region and the electric conductivity of an earth layer adjacent the selected earth layer.

* * * * *